PROCESS FOR RECOVERING PYRIDINE CAR-
BOXYLIC ACIDS FROM PYRIDINE CARBOXYLIC
ACID BISULFATES

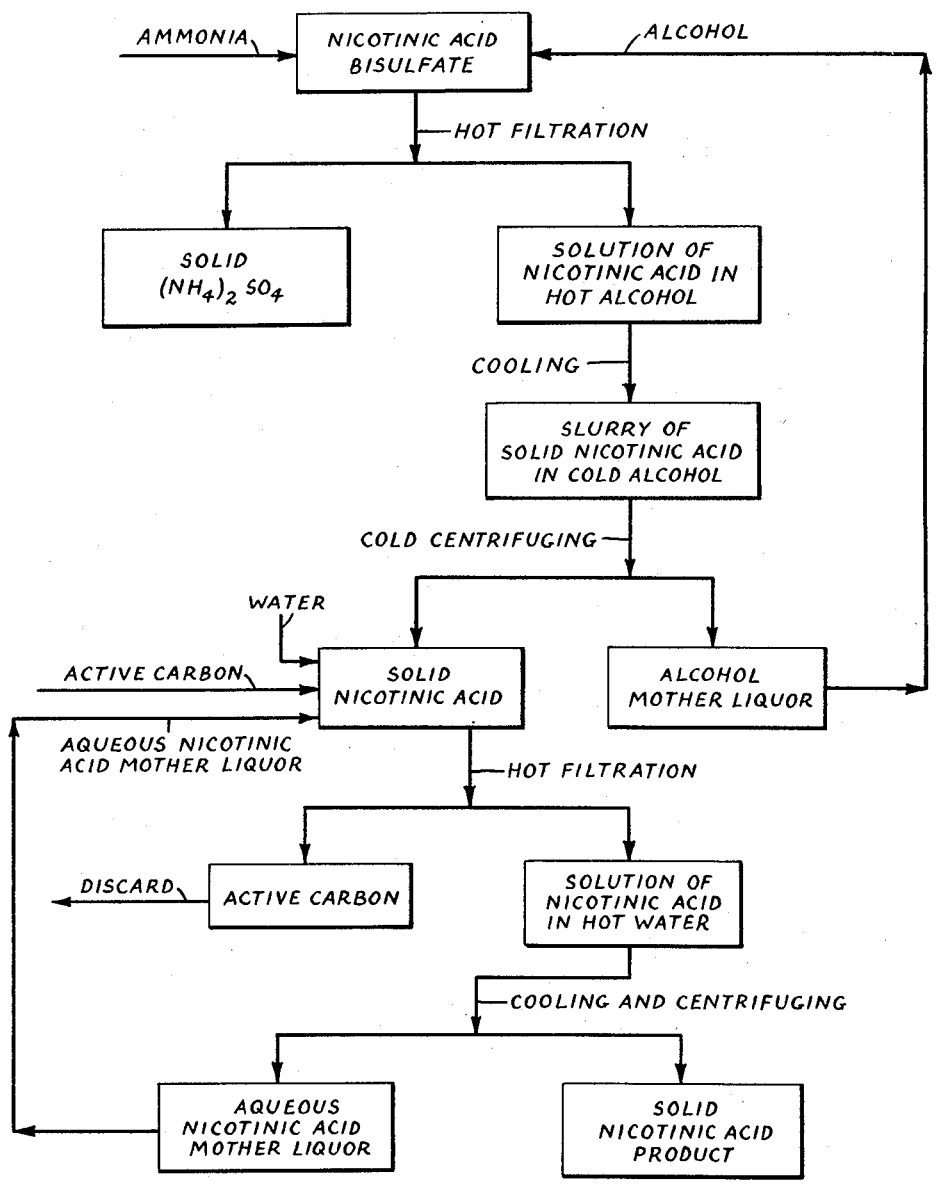

Andrew J. Martin, East Orange, N. J., assignor to Allied
Chemical & Dye Corporation, New York, N. Y., a
corporation of New York Application April 24, 1951, Serial No. 222,543

12 Claims. (Cl. 260—295)

This invention relates to a process for recovering pyridine carboxylic acids from pyridine carboxylic acid bisulfates, and more particularly to a cyclic recovery process in which the liquid residues obtained are recycled.

Pyridine carboxylic acids may advantageously be produced by the oxidation in a sulfuric acid-containing oxidizing medium of N-heteroaryl compounds containing a single pyridine nucleus and having an oxidizable organic hydrocarbon grouping attached to the pyridine nucleus by one or more carbon-to-carbon linkages. Nicotinic acid, i. e. 3-pyridine carboxylic acid, may be produced from such N-heteroaryl compounds as have an oxidizable hydrocarbon grouping attached to the pyridine nucleus in a single beta or 3-position, and not more than two additional oxidizable hydrocarbon substituents attached to the pyridine ring, each of which is in an alpha position, for example quinoline, quinaldine, 3-methyl pyridine, 5- and 8-hydroxyquinolines, 5- and 8-nitroquinolines, 2,3-dimethyl pyridine, 2,3,6-trimethyl pyridine and the like, either with sulfuric acid alone or with nitric acid or other oxidizing agents in a sulfuric acid oxidizing medium, or with a mixed sulfuric acid-nitric acid oxidizing agent, in a substantially anhydrous medium, in each case using an excess of sulfuric acid over that required to oxidize the N-heteroaryl compound to nicotinic acid. Isonicotinic acid, i. e. 4-pyridine carboxylic acid, may be produced for example from 4-picoline, or from 2,4-lutidine; cinchomeronic acid, i. e. 3,4-pyridine dicarboxylic acid, may be produced for example from 3,4-dialkyl pyridines, isoquinoline, etc. Other pyridine carboxylic acids are produced from the corresponding N-heteroaryl compounds.

The product obtained from such oxidations is a mixture of pyridine carboxylic acid with the excess of sulfuric acid over that used or lost in the oxidation process, so that to recover the pyridine carboxylic acid in pure form, it is necessary to separate it substantially completely from the sulfuric acid.

A process recently proposed for the partial separation of pyridine carboxylic acids from the concentrated sulfuric acid of such oxidation masses is described in co-pending application of Max B. Mueller, Serial No. 222,592 filed as of even date herewith, wherein the pyridine carboxylic acid-sulfuric acid-containing oxidation mass is diluted with a controlled limited quantity of water to within a sulfuric acid concentration range calculated as free sulfuric acid, within which range the pyridine carboxylic acid-sulfuric acid complex (for example, nicotinic acid bisulfate) has reduced solubility characteristics, to precipitate, with or without cooling, a substantial proportion of the pyridine carboxylic acid as pyridine carboxylic acid bisulfate, and recovering the pyridine carboxylic acid bisulfate. The pyridine carboxylic acid bisulfate thus obtained is particularly adapted for treatment according to the present invention to recover pyridine carboxylic acid therefrom.

It is an object of the present invention to provide a process for recovering substantially pure pyridine carboxylic acids from pyridine carboxylic acid bisulfates.

It is a further object of the invention to provide such a process wherein the liquid residues obtained may be recycled.

A still further object is to provide such a process wherein virtually no troublesome waste products are produced.

It is another object of the invention to provide such a recovery process in which valuable by-products are produced.

These and other objects are accomplished according to my invention wherein a solid equimolecular pyridine carboxylic acid-sulfuric acid complex (for example, nicotinic acid bisulfate) of a character such as that obtained by the Mueller process above referred to, is treated at an elevated temperature in the presence of a lower aliphatic alcohol having from 1 to 6 carbon atoms inclusive, with a quantity of anhydrous ammonia sufficient to combine with the sulfuric acid of the pyridine carboxylic acid bisulfate to form and precipitate alcohol-insoluble ammonium sulfate, releasing the pyridine carboxylic acid which dissolves in the hot alcohol, whereupon the two phases are separated and the pyridine carboxylic acid is recovered from the alcohol solution. The liquid residues of the process may be recycled to subsequent operations. The ammonium sulfate is recovered as a valuable by-product useful as a fertilizer.

In the accompanying drawing, the single figure illustrates schematically a preferred embodiment of the process of my invention showing the several steps in the process as applied to nicotinic acid, and the recycling of the various liquors obtained in the process.

In carrying out the process of my invention, solid pyridine carboxylic acid bisulfate is mixed with a lower aliphatic alcohol, and a quantity of ammonia is added, at least sufficient to combine with the sulfuric acid of the pyridine carboxylic acid bisulfate to form ammonium sulfate and free pyridine carboxylic acid. The ammonium sulfate precipitates out of solution and the resulting slurry is heated to insure solution of substantially all the pyridine carboxylic acid in the alcohol, leaving the alcohol-insoluble ammonium sulfate in the solid phase. Preferably, the slurry is heated at this stage for a time sufficient to drive off substantially all water which may be present, for example by azeotropic distillation with the alcohol. The hot slurry is then mechanically separated, as by centrifuging, filtering or the like, into solid ammonium sulfate and mother liquor comprising essentially a solution of pyridine carboxylic acid in hot alcohol.

The solid ammonium sulfate is recovered and forms a valuable merchantable by-product of the process.

The hot solution of pyridine carboxylic acid in alcohol is then cooled to precipitate pyridine carboxylic acid and the resulting slurry is mechanically separated cold, to obtain crude solid pyridine carboxylic acid and a mother liquor consisting essentially of alcohol containing a small quantity of pyridine carboxylic acid. This mother liquor may be recycled in whole or in part to the initial step for slurrying fresh pyridine carboxylic acid bisulfate in alcohol.

The crude pyridine carboxylic acid recovered by crystallization from the alcohol may be purified in any suitable manner. In a preferred method, the crude pyridine carboxylic acid is dissolved in hot water, for example at a temperature between about 50° C. and about 100° C. (which may be the mother liquor obtained from the crystallization of nicotinic acid from water in a subsequent step). This aqueous solution is then heated to the boiling point of the solvent mixture usually to the alcohol-water azeotrope distillation temperature, to remove residual alcohol which may be recovered for reuse in the process, then treated with active carbon and filtered hot, to remove impurities, cooled preferably below about 25°

C. to precipitate purified pyridine carboxylic acid, which may then be recovered by mechanical separation, such as centrifuging or filtering, as the final product pyridine carboxylic acid.

The mother liquor from the final crystallization, consisting essentially of water containing a small quantity of pyridine carboxylic acid, may be recycled to the process and used for dissolving the crude pyridine carboxylic acid obtained by crystallization from the alcohol, or to any appropriate point in the pyridine carboxylic acid recovery system, for example for use as dilution water in the controlled dilution of pyridine carboxylic acid-sulfuric acid-containing oxidation masses, to precipitate pyridine carboxylic acid bisulfate as described in copending application of Max B. Mueller referred to above.

The ammonia used to liberate the pyridine carboxylic acid from its sulfuric acid complex should preferably be anhydrous and is preferably added as gaseous ammonia, but liquid ammonia may be used if desired, or even aqueous ammonia provided the added water is substantially completely removed, as by azeotropic distillation, before separation of the solid ammonium sulfate from the pyridine carboxylic acid-alcohol solution.

The quantity of ammonia used should be at least about the stoichiometric quantity required to combine with all the sulfuric acid in the pyridine carboxylic acid-sulfuric acid complex, including any free acid that may be present. A slight excess over the combining quantity may conveniently be used, and does no harm. Such excess insures complete precipitation of ammonium sulfate, and while it forms a small quantity of ammonium nicotinate, such small amount is soluble in the alcohol, and is readily decomposed to pyridine carboxylic acid and $NH_3$ when the alcohol solution is heated.

The aliphatic alcohols suitable for use in the process of my invention are the lower aliphatic alcohols having from 1 to 6 carbon atoms inclusive. Such alcohols when substantially anhydrous are virtually non-solvents for ammonium sulfate, even at their boiling points, and have, at temperatures in the vicinity of their boiling points and somewhat below, sufficiently high solvent powers for pyridine carboxylic acid, so that by the use of reasonable quantities of alcohol, all the pyridine carboxylic acid liberated from the pyridine carboxylic acid bisulfate treated, is dissolved. At reduced temperatures, i. e. at room temperatures or below, the solvent powers of the alcohols for the pyridine carboxylic acids are considerably less than at the higher temperatures, so that crystallization of nicotinic acid from hot solutions in these alcohols may readily be effected by cooling. Thus, for example, n-butanol at 100° C. will dissolve up to 7.5% of nicotinic acid; at 75° C., 4.0%; and at 25° C., only 0.7%. Isopropanol at 83° C. dissolves up to about 5.7% nicotinic acid; at 59° C., about 2.7%; at 29° C., about 0.8%. A mixture of pentanols known commercially as "Pentasol" and having approximately the following composition: 1-pentanol, 26%; 2-pentanol, 8%; 3-pentanol, 18%; 3-methyl-1-butanol, 16%; and 2-methyl-1-butanol, 32%; dissolves about 5.7% nicotinic acid at 99° C. and at 75° C. about 3.1%, and at room temperature about 0.6%. Isonicotinic acid is soluble in n-butanol to the extent of .83% at 82° C., and of only .061% at 12.5° C.

The preferred alcohols are the monohydroxy aliphatic alcohols containing 4 to 6 carbon atoms, which have limited solubility in water. This limited water solubility prevents undue retention of water-soluble ammonium sulfate in the pyridine carboxylic acid-alcohol solution, and permits ready separation by stratification of the mixed alcohol-water liquors produced in the process.

The quantity of alcohol used should be sufficient to dissolve all the pyridine carboxylic acid liberated from the pyridine carboxylic acid bisulfate, when the mixture is heated to the vicinity of its boiling point. An excess may be used if desired, but preferably the quantity is kept as low as feasible to facilitate completeness of crystallization of the pyridine carboxylic acid upon subsequent cooling. The quantities of alcohol used may vary somewhat depending on the particular alcohol used; in the case of methanol, ethanol and the propanols, at least about 10 parts of alcohol per part of pyridine carboxylic acid bisulfate being required; in the case of the butanols and pentanols, at least about 5 parts of alcohol per part of pyridine carboxylic acid bisulfate usually being sufficient.

After the pyridine carboxylic acid bisulfate has been mixed with alcohol and ammonia, the mixture is heated to a temperature sufficiently high to dissolve all the liberated pyridine carboxylic acid, preferably to the vicinity of the boiling point of the alcohol used. At this stage, the mixture is preferably heated sufficiently to remove any water which may be present in the mixture, for example by azeotropic distillation to reduce retention of water-soluble ammonium sulfate in the alcoholic solution of nicotinic acid and also to decompose any ammonium pyridine carboxylate which may be present, to pyridine carboxylic acid and ammonia.

The temperature to which the hot alcohol-nicotinic acid solution is cooled depends on the degree of completeness of pyridine carboxylic acid recovery desired. Since the alcoholic mother liquor from this crystallization step may be, and preferably is, reused in the process to slurry an incoming batch of pyridine carboxylic acid bisulfate, removal of pyridine carboxylic acid need not be exhaustive. Cooling to room temperature (about 25° C.) is usually sufficient to effect substantially complete precipitation of the pyridine carboxylic acid such that the recycled alcohol-mother liquor contains between about 1% and about 2% of pyridine carboxylic acid or less, although cooling to lower temperatures, for example 0° C. or below may be carried out if desired. Accordingly, I prefer to cool to between about 0° C. and about 25° C. at this stage. Cooling may be effected by any desired means, conveniently by the direct addition to the mixture of solid carbon dioxide.

An important aspect of my invention is the provision of a process wherein virtually no troublesome waste products are produced. Thus, in the progressive steps of the process, the first by-product produced is solid ammonium sulfate which is useful as a fertilizer and may be marketed directly. The next by-product is the alcohol mother liquor containing small quantities of pyridine carboxylic acid. This liquor may be recycled to the initial pyridine carboxylic acid-bisulfate slurrying step either directly or after clarification with active carbon and water removal if desired. The next by-product is the aqueous mother liquor from the final crystallization of pyridine carboxylic acid from water. This liquor may also be recycled either partly or entirely to the step for dissolving the crude pyridine carboxylic acid crystallized from alcohol, or partly or entirely to the earlier step of diluting the incoming pyridine carboxylic acid oxidation mass as described in copending application of Mueller above referred to. The alcohol-water mixtures produced at various stages of the process, for example by azeotropic distillation, may be resolved into alcohol and water by stratification or other means and the components reused in the process. Thus, the only waste products produced in my process are the several active carbon residues from the several clarification steps described. These active carbon waste products do not present any disposal problems as they can readily be burned or dumped.

The process of my invention is particularly adapted to the recovery of nicotinic acid, useful as a member of the group of B-complex vitamins, from nicotinic acid bisulfate.

The following specific examples further illustrate my invention.

*Example I*

46.25 parts of nicotinic acid bisulfate in the form of a centrifuge cake, obtained by combined dilution and cooling precipitation from a sulfuric acid-containing nicotinic acid oxidation mass, followed by centrifugal separation, and containing approximately 49.2% of nicotinic acid, about 46.9% of sulfuric acid (essentially all of it combined as nicotinic acid bisulfate) and about 3.9% of water were slurried in 524 parts of an n-butanol-containing liquor obtained as mother liquor from the crystallization of nicotinic acid from butanol, and containing approximately 98.5% butanol and 1.5% nicotinic acid. Into this slurry were run 7.75 parts of anhydrous gaseous ammonia, a quantity slightly in excess of that required to decompose the nicotinic acid bisulfate complex and to neutralize all of the sulfuric acid of the nicotinic acid bisulfate complex. Solid ammonium sulfate formed and precipitated out of solution. The resulting slurry was heated to about 105°–107° C. to remove water by azeotropic distillation with butanol, and the distilled butanol was recovered. The mass was then filtered hot through a plate filter to remove solid ammonium sulfate leaving the liberated nicotinic acid in solution in the hot butanol. The filter was flushed with 58 parts of butanol-containing liquor to exhaust ammonium sulfate of nicotinic acid containing mother liquor. 56 parts of ammonium sulfate filter cake (58.4% ammonium sulfate) were recovered. The combined filtrate, containing the liberated nicotinic acid in butanol solution at about 80° C., was transferred to a crystallizer, cooled by direct addition of solid carbon dioxide to about 0° C. in about 3.5 hours, at a rate of 20°–25° C. per hour to crystallize nicotinic acid. The slurry was centrifuged and the centrifuge flushed with 35 parts of cold butanol liquor. The filtrate from the centrifuge, amounting to about 503 parts and containing about 99% butanol and about 1% nicotinic acid, was clarified with active carbon and stored for reuse in slurrying a fresh batch of nicotinic acid bisulfate as described above. The crude crystalline nicotinic acid cake from the centrifuge, containing (after removal of a sample—1 part) about 22.0 parts nicotinic acid and about 9.3 parts butanol, was mixed with about 362 parts of water containing a small quantity of nicotinic acid (1.2%), the dissolving water being made up in major part of water used in a subsequent final nicotinic acid crystallization step. The mixture was heated to 95°–104° C. to remove butanol by azeotropic distillation with water. The distillate was allowed to stratify, the butanol layer being retained for reuse. The hot (75° C.) nicotinic acid-water solution was treated with 10 parts active carbon and 4 parts of filter aid, filtered hot to remove impurities. The carbon-filter aid cake was recovered for reuse in clarification of crude n-butanol mother liquor before recycling to the initial nicotinic acid bisulfate slurry step. The purified hot nicotinic acid-water solution was transferred to a crystallizer and cooled slowly by means of circulating water from 75° C. to 36° C. in 2.5 hours. Then cooling was continued by the addition of solid carbon dioxide to the charge at a rate controlled to lower the temperature from 36° C. to 1.5° C. in 2.5 hours.

Nicotinic acid precipitated and the resulting slurry was centrifuged, first at low speed, washed with cold water (1° C.), then centrifuged at increasingly higher speeds until the centrifuge cake was apparently "dry," i. e. contained about 81% nicotinic acid and about 19% water.

The aqueous filtrate, containing about 1.2% nicotinic acid and about 98.8% water was recycled for reuse in the system; in part as solution water for the crude nicotinic acid crystals from butanol, and in part as dilution water in the initial precipitation of nicotinic acid bisulfate from a nicotinic acid-sulfuric acid oxidation mass.

The moist crystalline nicotinic acid filter cake was dried in a vacuum pan dryer, and yielded 16.5 parts of dry nicotinic acid, corresponding to a yield of 72% by weight of theoretical of the nicotinic acid in the original nicotinic acid-bisulfate charge. The remaining 28% is for the most part, recycled to the process system at various stages as indicated, and hence is eventually recovered except for a relatively small percentage of mechanical losses, so that the total yield amounted to about 93% of theoretical. The recovered nicotinic acid had a melting point of 235° C. and a purity of 99.9%.

*Example II*

Proceeding in a manner similar to that described under Example I, 55 parts of nicotinic acid bisulfate were suspended in 395 parts (500 ml.) of isopropanol, and to this suspension were added 8.5 parts of ammonia as a solution in 166.5 parts of isopropanol. The mixture was heated to reflux, the solution was filtered hot to remove undissolved ammonium sulfate. The resulting nicotinic acid solution in isopropanol was cooled to 0° C., whereupon nicotinic acid crystallized out of solution and was separated from the mother liquor by filtration. The crude nicotinic thus obtained was dissolved in water, slurried with active carbon, heated, filtered hot, cooled to crystallize nicotinic acid, which was recovered by filtration. The nicotinic acid recovered amounted to 21 parts corresponding to a yield of 68% of theoretical.

While the above illustrates the preferred embodiments of my invention, it will be understood that departures may be made therefrom within the scope of the specification and claims.

I claim:

1. In a process for recovering pyridine carboxylic acids from pyridine mono carboxylic acid bisulfates, the steps which comprise treating in a substantially anhydrous medium a solid, crystalline pyridine carboxylic acid bisulfate with anhydrous ammonia in the presence of a lower mono hydroxy, saturated aliphatic alcohol having from 1 to 6 carbon atoms inclusive and mechanically separating the solid ammonium sulfate thus formed from the solution of the pyridine carboxylic acid in the alcohol at an elevated temperature sufficient to maintain substantially all the pyridine carboxylic acid in solution in said alcohol until substantially complete separation of the phases has been effected.

2. In a process for recovering pyridine carboxylic acids from pyridine mono carboxylic acid bisulfates, the steps which comprise treating in a substantially anhydrous medium a solid, crystalline pyridine carboxylic acid bisulfate with a quantity of anhydrous ammonia at least sufficient to combine with all the sulfuric acid in the bisulfate material, in the presence of a quantity of a lower mono hydroxy, saturated aliphatic alcohol having from 1 to 6 carbon atoms inclusive sufficient to dissolve substantially all the pyridine carboxylic acid liberated from the pyridine carboxylic acid bisulfate at a temperature of approximately the boiling point of the alcohol, heating the resulting slurry of solid ammonium sulfate and pyridine carboxylic acid-alcohol solution to approximately the boiling point of the alcohol, mechanically separating the solid ammonium sulfate from the pyridine carboxylic acid-alcohol solution while maintaining the temperature sufficiently high to retain substantially all the pyridine carboxylic acid in solution in the alcohol, cooling the separated pyridine carboxylic acid-alcohol solution to precipitate a pyridine carboxylic acid and recovering the pyridine carboxylic acid.

3. In a process for recovering nicotinic acid from nicotinic acid bisulfate, the steps which comprise treating in a substantially anhydrous medium, solid, crystalline nicotinic acid bisulfate with anhydrous ammonia in the presence of a lower mono hydroxy, saturated aliphatic alcohol having from 1 to 6 carbon atoms inclusive and mechanically separating the solid ammonium sulfate thus formed from the solution of nicotinic acid in the alcohol at an elevated temperature sufficient to maintain substantially all the nicotinic acid in solution in said alcohol until substantially complete separation of the phases has been effected.

4. In a process for recovering nicotinic acid from nicotinic acid bisulfate, the steps which comprise treating in a substantially anhydrous medium, solid, crystalline nicotinic acid bisulfate with a quantity of anhydrous ammonia at least sufficient to combine with all the sulfuric acid in the bisulfate material, in the presence of a quantity of a lower mono hydroxy, saturated aliphatic alcohol having from 1 to 6 carbon atoms inclusive sufficient to dissolve substantially all the nicotinic acid liberated from the nicotinic acid bisulfate at a temperature of approximately the boiling point of the alcohol, heating the resulting slurry of solid ammonium sulfate and nicotinic acid-alcohol solution to approximately the boiling point of the alcohol, mechanically separating the solid ammonium sulfate from the nicotinic acid-alcohol solution while maintaining the temperature sufficiently high to retain substantially all the nicotinic acid in solution in the alcohol, cooling the separated nicotinic acid-alcohol solution to precipitate nicotinic acid and recovering the nicotinic acid.

5. In a process for recovering nicotinic acid from nicotinic acid bisulfate, the steps which comprise treating in a substantially anhydrous medium, solid, crystalline nicotinic acid bisulfate with a quantity of anhydrous ammonia at least sufficient to combine with all the sulfuric acid in the bisulfate material, in the presence of a quantity of a lower monohydroxy, saturated aliphatic alcohol having from 1 to 6 carbon atoms inclusive sufficient to dissolve substantially all the nicotinic acid liberated from the nicotinic acid bisulfate at a temperature of approximately the boiling point of the alcohol, heating the resulting slurry of solid ammonium sulfate and nicotinic acid-alcohol solution to approximately the boiling point of the alcohol, mechanically separating the solid ammonium sulfate from the nicotinic acid-alcohol solution while maintaining the temperature sufficiently high to retain all the nicotinic acid in solution in the alcohol, cooling the separated nicotinic acid-alcohol solution to precipitate nicotinic acid, recovering the nicotinic acid, and recycling the alcoholic mother liquor to the next initial ammonia treating step.

6. In a process for recovering nicotinic acid from nicotinic acid bisulfate, the steps which comprise treating in a substantially anhydrous medium, solid, crystalline nicotinic acid bisulfate with a quantity of anhydrous ammonia at least sufficient to combine with all the sulfuric acid in the bisulfate material, in the presence of a quantity of a lower monohydroxy, saturated aliphatic alcohol having from 1 to 6 carbon atoms inclusive sufficient to dissolve substantially all the nicotinic acid liberated from the nicotinic acid bisulfate at a temperature of approximately the boiling point of the alcohol, heating the resulting slurry of solid ammonium sulfate and nicotinic acid-alcohol solution to approximately the boiling point of the alcohol, mechanically separating the solid ammonium sulfate from the nicotinic acid-alcohol solution while maintaining the temperature sufficiently high to retain all the nicotinic acid in solution in the alcohol, cooling the separated nicotinic acid-alcohol solution to precipitate nicotinic acid, recovering the nicotinic acid, dissolving the recovered nicotinic acid in water, heating to dissolve the nicotinic acid, adding active carbon to the nicotinic acid solution, filtering the hot solution, cooling to precipitate nicotinic acid and recovering the precipitated nicotinic acid.

7. In a process for recovering nicotinic acid from nicotinic acid bisulfate, the steps which comprise treating in a substantially anhydrous medium, solid, crystalline nicotinic acid bisulfate with a quantity of anhydrous ammonia at least sufficient to combine with all the sulfuric acid in the bisulfate material, in the presence of a quantity of a lower monohydroxy, saturated aliphatic alcohol having from 1 to 6 carbon atoms inclusive sufficient to dissolve substantially all the nicotinic acid liberated from the nicotinic acid bisulfate at a temperature of approximately the boiling point of the alcohol, heating the resulting slurry of solid ammonium sulfate and nicotinic acid-alcohol solution to approximately the boiling point of the alcohol, mechanically separating the solid ammonium sulfate from the nicotinic acid-alcohol solution while maintaining the temperature sufficiently high to retain all the nicotinic acid in solution in the alcohol, cooling the separated nicotinic acid-alcohol solution to precipitate nicotinic acid, recovering the nicotinic acid, recycling the alcoholic mother liquor to a succeeding ammonia treating step, dissolving the recovered nicotinic acid in water, heating to dissolve the nicotinic acid, adding active carbon to the nicotinic acid solution, filtering the hot solution, cooling to precipitate nicotinic acid, recovering the precipitated nicotinic acid, and recycling the aqueous filtrate to dissolve a succeeding batch of crude nicotinic acid from the alcohol crystallization step.

8. In a process for recovering nicotinic acid from nicotinic acid bisulfate, the steps which comprise slurrying in a substantially anhydrous medium, solid crystalline nicotinic acid bisulfate in a quantity of a lower monohydroxy, saturated aliphatic alcohol having from 1 to 6 carbon atoms inclusive, at least sufficient to dissolve all the nicotinic acid subsequently liberated from the nicotinic acid bisulfate, adding to the slurry a quantity of anhydrous ammonia substantially stoichiometrically equivalent to the total of free and combined sulfuric acid present, heating the slurry to a temperature between about 50° C. and the boiling point of the solvent mixture, mechanically separating the resulting solid, precipitated ammonium sulfate from the nicotinic acid-alcohol solution while maintaining the temperature of the mixture between the above limits, cooling the resulting filtrate to a temperature between about 25° C. and about 0° C. to precipitate crude nicotinic acid, mechanically separating said crude nicotinic acid from the alcoholic mother liquor, dissolving the crude nicotinic acid in water at a temperature between about 50° C. and about 100° C., treating said aqueous solution with active carbon, mechanically separating said active carbon from the aqueous nicotinic acid solution at a temperature within the above limits, cooling the purified nicotinic acid solution to a temperature of below about 25° C. to precipitate purified nicotinic acid, mechanically separating said purified nicotinic acid from the aqueous mother liquor, and recycling the several mother liquors to the process.

9. In a process for recovering nicotinic acid from nicotinic acid bisulfate, the steps which comprise treating in a substantially anhydrous medium, solid, crystalline nicotinic acid bisulfate with anhydrous ammonia in the presence of butanol and mechanically separating the solid ammonium sulfate thus formed from the solution of nicotinic acid in the butanol at an elevated temperature sufficient to maintain substantially all the nicotinic acid in solution in said butanol until substantially complete separation of the phases has been effected.

10. In a process for recovering isonicotinic acid from isonicotinic acid bisulfate, the steps which comprise treating in a substantially anhydrous medium, solid, crystalline isonicotinic acid bisulfate with a quantity of anhydrous ammonia at least sufficient to combine with all the sulfuric acid in the bisulfate material, in the presence of a quantity of butanol sufficient to dissolve substantially all the isonicotinic acid liberated from the isonicotinic acid bisulfate at a temperature of approximately the boiling point of the butanol, heating the resulting slurry of solid ammonium sulfate and isonicotinic acid-butanol solution to approximately the boiling point of the butanol, mechanically separating the solid ammonium sulfate from the isonicotinic acid-butanol solution while maintaining the temperature sufficiently high to retain all the isonicotinic acid in solution in the butanol, cooling the separated isonicotinic acid-butanol solution to precipitate isonicotinic acid and recovering the isonicotinic acid.

11. In a process for recovering nicotinic acid from nicotinic acid bisulfate, the steps which comprise treating in a substantially anhydrous medium, solid, crystalline nicotinic acid bisulfate with a quantity of anhydrous ammonia at least sufficient to combine with all the sulfuric acid in the bisulfate material, in the presence of a quantity of butanol sufficient to dissolve substantially all the nicotinic acid liberated from the nicotinic acid bisulfate at a temperature of approximately the boiling point of the butanol, heating the resulting slurry of solid ammonium sulfate and nicotinic acid-butanol solution to approximately the boiling point of the butanol, mechanically separating the solid ammonium sulfate from the nicotinic acid-butanol solution while maintaining the temperature sufficiently high to retain all the nicotinic acid in solution in the butanol, cooling the separated nicotinic acid-butanol solution to precipitate nicotinic acid, recovering the nicotinic acid, and recycling the butanol-containing mother liquor to a succeeding ammonia treating step.

12. In a process for recovering nicotinic acid from nicotinic acid bisulfate, the steps which comprise slurrying in a substantially anhydrous medium, solid, crystalline nicotinic acid bisulfate in at least about 5 parts by weight of butanol per part of nicotinic acid bisulfate, adding to the slurry a quantity of anhydrous ammonia stoichiometrically equivalent to the sulfuric acid present, both free and combined, heating the slurry to a temperature between about 105° C. and about 107° C., mechanically separating the resulting solid, precipitated ammonium sulfate from the nicotinic acid-butanol solution while maintaining the temperature of the mixture between the above limits, cooling the resulting filtrate to a temperature between about 0° C. and about 25° C. to precipitate crude nicotinic acid, mechanically separating said crude nicotinic acid from the butanol-containing mother liquor, dissolving the crude nicotinic acid in water at a temperature between about 50° C. and about 100° C., treating said aqueous solution with active carbon, mechanically separating said active carbon from the aqueous nicotinic acid solution at a temperature within the above limits, cooling the purified nicotinic acid solution to a temperature of below about 25° C. to precipitate purified nicotinic acid, mechanically separating said purified nicotinic acid from the aqueous mother liquor, and recycling the several mother liquors to the process.

References Cited in the file of this patent

UNITED STATES PATENTS

| | | |
|---|---|---|
| 2,283,991 | Hill | May 26, 1942 |
| 2,295,870 | Seibert et al. | Sept. 15, 1942 |
| 2,314,843 | Hultquist | Mar. 23, 1943 |
| 2,447,234 | Dean et al. | Aug. 17, 1948 |
| 2,476,004 | Teeters | July 12, 1949 |
| 2,578,672 | Corson et al. | Dec. 18, 1951 |

OTHER REFERENCES

Grant: "Hackh's Chem. Dict.," 3rd ed. (1944) p. 49.

Hodgman: "Handbook of Chem. and Physics," 28th ed. (1944) p. 908.